US007258277B2

(12) United States Patent
Baker et al.

(10) Patent No.: US 7,258,277 B2
(45) Date of Patent: Aug. 21, 2007

(54) METHOD FOR ENHANCING MAIL PIECE PROCESSING SYSTEM

(75) Inventors: Christopher A. Baker, New Canaan, CT (US); Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 81 days.

(21) Appl. No.: 11/016,494

(22) Filed: Dec. 17, 2004

(65) Prior Publication Data

US 2006/0131378 A1 Jun. 22, 2006

(51) Int. Cl.
*G06F 19/00* (2006.01)

(52) U.S. Cl. ...................... 235/385; 235/375; 235/487; 713/300

(58) Field of Classification Search ................ 235/385, 235/462.12
See application file for complete search history.

(56) References Cited

U.S. PATENT DOCUMENTS

| | | | | |
|---|---|---|---|---|
| 5,419,440 | A | 5/1995 | Picoult | 209/583 |
| 5,703,783 | A * | 12/1997 | Allen et al. | 700/213 |
| 5,777,883 | A | 7/1998 | Lau et al. | 364/478.08 |
| 6,002,095 | A | 12/1999 | Bodie et al. | 209/584 |
| 6,026,385 | A | 2/2000 | Harvey et al. | 705/408 |
| 6,205,373 | B1 | 3/2001 | Hart et al. | 700/222 |
| 6,278,988 | B1 | 8/2001 | Lau et al. | 707/1 |
| 6,363,484 | B1 * | 3/2002 | Cordery et al. | 713/182 |
| 6,483,599 | B1 | 11/2002 | Woodman et al. | 358/1.15 |
| 6,510,992 | B2 * | 1/2003 | Wells et al. | 235/385 |
| 6,662,079 | B2 | 12/2003 | Bodie | 700/227 |
| 6,725,429 | B1 | 4/2004 | Gardner et al. | 715/530 |
| 6,791,050 | B2 | 9/2004 | Daniels, Jr. et al. | 209/584 |
| 2002/0176111 | A1 | 11/2002 | Lyle et al. | |
| 2004/0004119 | A1 | 1/2004 | Baldassari et al. | |
| 2004/0125406 | A1 | 7/2004 | McManus et al. | |
| 2005/0137991 | A1 | 6/2005 | Bruce et al. | |
| 2005/0149765 | A1 * | 7/2005 | Aldstadt et al. | 713/300 |

FOREIGN PATENT DOCUMENTS

| | | | |
|---|---|---|---|
| EP | 0368498 | A2 | 5/1990 |
| WO | WO98/17405 | A1 | 4/1998 |
| WO | WO03/106057 | A2 | 1/2000 |
| WO | WO03/035282 | A2 | 12/2000 |
| WO | WO01/02104 | A1 | 1/2001 |

* cited by examiner

*Primary Examiner*—Seung Ho Lee
(74) *Attorney, Agent, or Firm*—Michael J. Cummings; Angelo N. Chaclas

(57) ABSTRACT

A method for processing mail pieces having information thereon includes scanning the mail piece information and storing scanned mail piece information. Stored information is accessed when a scanned mail piece information is incomplete to obtain previously stored complete mail piece information. The previously stored complete mail piece information is employed in processing the mail piece with the incomplete information. The information may be a code or text that is scanned and stored during the processing of the mail. Fragmentary information from various sources on the scanned mail piece may be combined to access a previously stored mail piece record. The accessed information may be displayed.

11 Claims, 3 Drawing Sheets

METHOD FOR ENHANCING MAIL PIECE PROCESSING SYSTEM

FIELD OF INVENTION

The present invention relates to mail piece handling systems and more particularly a method for enhancing the sortation of mail pieces.

BACKGROUND OF THE INVENTION

Posts and private carriers frequently provide discounts to mailers who presort mail. The discounts vary from country to country and are often dependent upon the level of presort. The more specifically the mail has been sorted in relation to delivery by the Post or carrier, the greater the discount.

These mail sortations implemented by the mailer, by the Posts or the private carriers often utilize a multiple-pass radix sort algorithm. The United States National Institute of Standards and Technology (USNIST) defines a radix sort as "a multiple pass distribution sort algorithm that distributes each item to a bucket according to part of the system's key, beginning with the least significant part of the key." After each pass, items are collected from the buckets or bins, keeping the items in order, then re-distributed according to the next most significant part of the key. In a mailing system radix-type sortation, the key can be a delivery point sequence number accessed through a United States Postal Service (USPS) ZIP code, and the bucket can be the mailing system destination sortation bin. Use of a radix sort allows mail pieces to be sorted into delivery point sequence (carrier walk sequence), and eliminates the need for the delivery person to sort mail by hand before delivery. However, in implementing multiple pass sortations of this type, to achieve a delivery point sequence requires that the ordering of mail from prior sortation passes be maintained when the mail pieces from each of the sortation bins are combined for the next sortation pass.

Current systems for pre-sorting mail for presentation to a Post or a carrier typically do not make good use of available information to improve processing efficiency. Frequently, when mail is processed, the first sortation pass through mailing system sortation equipment is often a data gathering or rough sortation pass. Typically, this first pass through the sorter is employed to: read address information; gather address information for development of subsequent sortation schemes; apply USPS POSTNET delivery point bar codes and PLANET track and trace bar codes if they have not already been applied to the mail; and, build a postal code volume file that will be processed by pre-sort software to build the sortation scheme and compute postal work sharing discounts.

USPS POSTal Numeric Encoding Technique (POSTNET) bar codes are printed on the face of the envelope and are read by the bar code reading system. The POSTNET specifications are documented in the USPS Domestic Mail Manual issue 58 in section C840 (bar coding standards for letters and flats) and in USPS Publication 25 (Designing letter mail) in chapter 4. The POSTNET bar code encodes the destination ZIP code (postal code) on the face of the mail piece and is employed for the sortation process. The USPS has also developed the PostaL Alpha Numeric Encoding Technique (PLANET) bar code to enable tracing and tracking of mail pieces by providing a unique identifier for each mailing. In combination with the POSTNET bar code identifying the destination, PLANET bar codes make it possible to uniquely identify each mail piece. The encoding scheme is the complement of the POSTNET encoding scheme (three tall bars and two short bars in each cluster of five). Thus, the same bar code reader can operate to read both POSTNET and PLANET bar codes. At the same time, the different symbology conventions make it possible to distinguish the two bar codes (mostly tall vs. mostly short bars). Posts throughout the world have developed arrangements for various other types of delivery coding and track and trace systems for processing and tracking and tracing mail.

This first pass sortation is not optimized. This is frequently because of the lack of address information for development of subsequent sortation schemes. The lack of information about the mail pieces prevents the sorter from running a sortation scheme optimized to the particular set of mail pieces to be processed. The sorter process may require one or more sortation passes than would have been required if the address information were available for analysis and processing prior to the first mail piece pass. As a result, the cost to process the mail is increased because, for example, the time to unload the mail from sortation bins of a sorter for each sortation pass or run can be substantial, particularly when large sorters are swept (emptied) of mail in the bins. Also the machine utilization may require additional operators and even additional sortation equipment to process a given volume of mail pieces within a specified time period.

The above problems are often compounded with windowed envelopes. Window envelopes are often used to simplify addressing of mail by allowing the address printed on the mail piece contents to be visible externally. This eliminates the risk of mismatching external printed addresses with the internal contents. Unfortunately, mail pieces are often smaller than the envelope and with automated processing; the inserted addressed pieces may shift and obscure portions of the address or preprinted bar codes. Such mail is not possible to process reliably on automation equipment and is not acceptable to the USPS.

Extra passes of the mail through the sortation system not only expose the mail to possible damage, but also represent a significant time and labor effort. Preparing and staging the mail for each such sortation pass consumes additional time and labor, and machine processing time. Furthermore, the additional sortation and staging further expose the mail to possible errors if it is staged incorrectly and will further extend the mail processing time.

Various prior designs of bar code sorters (BCS) and multiple line optical character readers (MLOCR) have recorded bar code information and text information from mail pieces passing the BCR or MLOCR stations for generally three main purposes. First, it has been used to allow analysis of the timing of pieces passing the readers during system tests. Secondly, POSTNET bar code data is captured on production systems to gather the list of mail pieces that have passed through the system. This data is then processed through pre-sort discount sort software to compute the postal discounts that will be obtained and to allow creation and optimization of multiple pass sortation plans that will properly sequence the mail to achieve the pre-sort discounts. Third, POSTNET and PLANET code data is captured by the USPS on their sorting equipment and relayed to mailers or recipients to enable them to see the progress of the mail pieces through the postal transportation system (tracing and tracking information). These prior instances of data capture from mail pieces on sorting equipment are very limited in their use and any unsuccessful read or reconstruction of the address data will preclude POSTNET barcoding of the mail pieces. It will result in rejection of the mail piece and the need to reprocess that piece. If the mail pieces (such as billing statements) were printed and therefore organized in any sequence initially (e.g. address order), that organization would be disrupted when pieces are rejected and lost from the mail stream.

Prior mail preparation systems have utilized mail-run data files (MRDF) which describe the intended contents of each envelope and may be used on a mail insertion, sealing, and postage payment system to ensure that the correct items are contained in each envelope (e.g. a two page statement, a privacy notice, and a credit card offer). In the past, data from the MRDF used for preparation of a mailing has also been passed to the pre-sort software to prepare the mailing manifests, the sortation plans, and calculate the work sharing discounts. Existing mail creation and sortation processes may create mail manifests or informational reports in standardized computer file formats, such as "mail.dat", for reporting the characteristics of mailings to the USPS. However, these systems have not effectively employed the data accessed during the first pass.

"Quick kill sortation plans" assign dedicated bins to mail that is known to have the critical mass to be packaged, for example, for the USPS or other Posts, directly from that sortation bin without the need to run that mail again. However, these quick kill sortation plans are based on having previously obtained information about the type of mail that will be processed by the sorter before the sortation process begins.

SUMMARY OF THE INVENTION

The present invention is usefully employed with various mail piece processing systems, such as mail creation equipment, mail inserting equipment, outgoing presort equipment, and incoming sortation equipment, to enhance the process by reducing the number of mail pieces that require additional processing. It also enhances the ability to trace and track certain mail pieces by the mailer or the recipient that would otherwise require additional processing.

The present invention can be implemented in a sorter system to help reduce the number of mail pieces that are moved into a reject sortation bin and thus require further processing. The present invention provides a method to reduce for certain mail pieces the number of multiple pass sortation processes.

It has been discovered that it is possible to utilize fragmentary information from a mail piece to identify that mail piece and employ that information to enable automated processing of the mail piece. The fragmentary information can be composite information from various information sources relating to a mail piece. These fragments may be obtained from contents of window envelopes whose contents slip, as for example during processing, thereby obscuring the address or bar code and rendering them non-automation capable.

It has been discovered that the processing of mail pieces can be enhanced by building and using a mail run data file (MRDF) as the mail pieces are being processed when limited data is available about the mail pieces. Data accessed during a first pass of the mail pieces can be employed to build an information repository for correction of read errors, repair of defective bar codes, or creation of a complete data repository for subsequent tracing and tracking operations.

A method for processing mail pieces having information thereon embodying the present invention includes the steps of processing the mail piece to scan the mail piece information. Information is stored and associated with that mail piece. The stored information is accessed when fragmentary information can be captured from a scanned mail piece. The fragmentary information is employed to search previously stored mail piece information to identify the mail piece record and obtain the complete information for that mail piece.

In accordance with a feature of the present invention, the code may be a single category of information including a delivery code representing address information on the mail piece such as a POSTNET bar code. In accordance with another aspect of the invention, the code can be a track-and-trace bar code.

A method for sorting mail pieces containing a code embodying the present invention includes feeding mail pieces to a scanner system. Mail piece codes are scanned by the scanner system. Completely scanned codes from mail pieces are stored in a MRDF. The MRDF is accessed for mail pieces during the sortation run where the scanned code is incomplete. The complete accessed code is transmitted to a sort computer and the sort computer processes the transmitted code to determine a destination sortation bin for the mail piece with the incomplete scanned code.

In accordance with an aspect of the present invention, the mail piece code is representative of text on the mail piece. Mail piece text and codes are scanned by the scanner system. Completely scanned codes and text from mail pieces are stored in a MRDF. The MRDF is accessed for mail pieces during the sortation run where the scanned code and text is incomplete. The complete accessed code and text is transmitted to a sort computer and the sort computer processes the transmitted code to determine a destination sortation bin for the mail piece with the incomplete scanned code.

BRIEF DESCRIPTION OF THE DRAWINGS

Reference is now made to the drawings wherein like reference numerals designate similar items in the various figures and in which.

DETAILED DESCRIPTION OF THE PREFERRED EMBODIMENT

Figure 1:
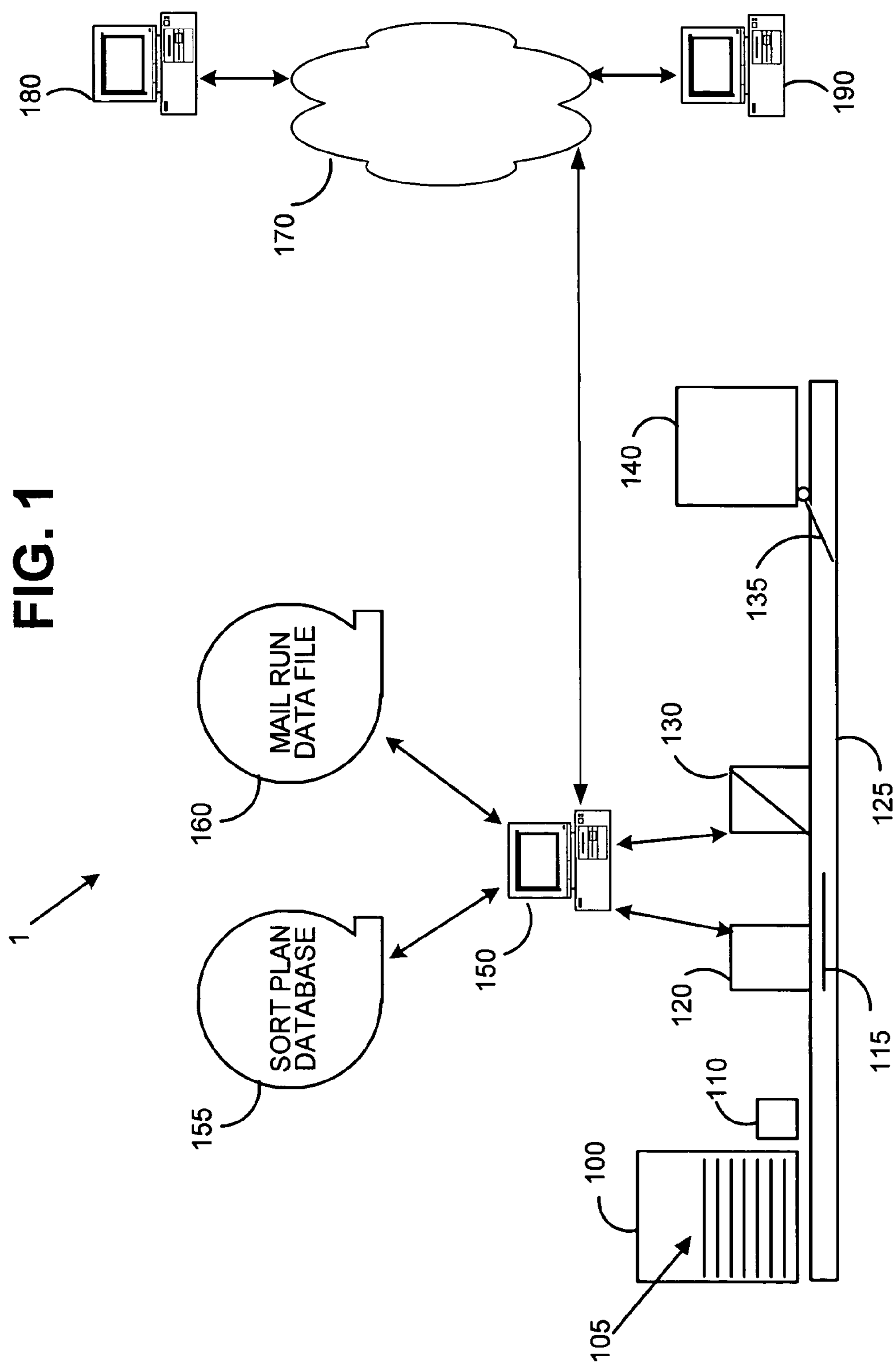
FIG. 1 is a diagrammatic view of a mail piece sorter system employing a reading, data capture and data access arrangement embodying the present invention.

Reference is now made to FIG. 1. A mail piece sorter system 1 includes a mail piece magazine 100, including a stack of mail pieces shown generally at 105. A mail piece feeder 110 feeds individual mail pieces out of the mail piece magazine 100 onto the sorter transport 125.

The input to the sorter transport 125, rather than being from the mail piece magazine 100, can be from other mailing systems equipment. For example, a printer may print inserts and envelopes, which are fed to an inserter system, which may fold the inserts and insert them into the envelopes. The envelope with the insert may then be moved to a mailing machine system, which seals the envelope and imprints postage on the envelope and thereafter moves the mail piece onto the sorter transport 125.

Imaging devices, such BCR 120 or OCR 130, are mounted along the sorter transport path and read bar codes and text information printed on the passing mail pieces, such as mail piece 115. These codes may be for example USPS POSTNET bar codes, USPS PLANET bar codes, delivery and/or tracking codes of other Posts, special service, customer, billing, and other useful codes and text. It should be expressly recognized that these two readers can be mounted in other points of the system, such as adjacent to the previously noted printer or mailing system or elsewhere to obtain the benefits of the present arrangement, as is described below. A sorter control computer 150 which may include a display for use by an operator, controls the operation of the sorter system and utilizes a sort plan database 155, which depends on text or bar code data (which may be in the form of a USPS ZIP code or other postal code) obtained from the mail piece to determine the proper sortation bin 140 for the scanned mail piece. For the sake of simplicity, only a single sortation bin 140 is shown, however, it should be recognized that sorter systems may include a very large number of sortation bins so that the sorter system can sort mail down to a very fine specificity.

The code data obtained from the scanned mail piece 115, when provided to the sorter control computer or mail server 150, with reference to the sort plan database 155, causes the sortation bin 140 diverter 135 to be deployed. In like manner, other (not shown) diverters may be selectively deployed to move the mail pieces into appropriate sortation bins. The computer or mail server arrangement is a matter of design choice. The arrangement may include distributed processing, centralized processing, a combination of distributed and centralized processing or other arrangement.

Deployed sortation bin diverter 135 guides the mail piece 115 into the sortation bin 140 as the mail piece is moved along transport 125. The bar code data is obtained from the scanned mail piece by BCR 120 and may be combined with the text data (such as address information, account information, address correction, service codes, endorsements, return address, etc.) gathered from an OCR 130 mounted on the sorter transport path. The bar code data and text data are added to and merged into a mail run data file 160, which is being built up with data during the course of the mail run. MRDF 160 may also log processing information for mail pieces. This varied data being merged into the mail run data file during the mail run is employed later in the same mail run process to provide enhanced operation of the sorter system 1 in processing mail pieces with incomplete needed information for the sortation process or for mail pieces where the bar code reader and/or OCR text reader fail to recover complete needed information. Thus, in the absence of a pre-existing mail run data file, these readers may collect information to construct such data for use in the mail piece sort operation during the mail processing run and, also, document tracking, through, for example, the internet 170, by remote computers. These remote computers can be a mailer, such as a business computer 180 and/or an addressee or recipient computer 190.

The mail pieces may also be scanned for other information used to uniquely identify a mail piece. Information (such as address, recipient name, account number, POSTNET bar code, PLANET bar code, remittance bar code) is stored and associated with that mail piece. The stored information is accessed when fragmentary information can be captured from a scanned mail piece. The fragmentary information is employed to search previously stored mail piece information to identify the mail piece record and obtain the complete information for that mail piece.

This also allows information that come from different sources (e.g. preprinted PLANET codes on envelopes and address information printed on inserts behind a window) to be associated together for use by subsequent processes downstream when tracing and tracing information is requested. For instance, a preprinted PLANET code might be associated with a particular advertising campaign or batch billing. The POSTNET code may describe a particular single family dwelling. The combination therefore describes a specific mail piece in that mailing and is the basis of the USPS PLANET code trace and track system. The present method allows these two crucial data elements to become associated in a database for downstream tracking.

The information may also be fragments of information such as the unobscured portions of a recipient name visible on a mail piece with an insert shifted in the window envelope opening. The information may be a combination of pieces of fragmentary information such as a partial name combined with a partial address. In each instance the information should desirably point to a single mail piece, unless statistical probability is employed to determine that the mail piece record pointed to is within a predetermined statistical probability the mail record containing the correct needed information. The stored information accessed on the basis of said mail piece incomplete information may be display on the display of sorter control computer 150 or other display. This enables selection of specific displayed information for use with said mail piece with incomplete information. This may be particularly helpful where more than one mail record the mail record might contain the correct needed information. The system operator can select the particular record stored in MRDF 160 for use with the mail piece with incomplete information or to send the mail piece to a reject bin.

Mail pieces that were run through sorter system 1 previously and also during a mail sortation run can be stored in MRDF 160 and that data may be compared to that being scanned and read later during the sorting pass. Sufficient information and data may exist in MRDF 160 (such as addressee information, account number, or POSTNET bar code) from the data stored from previous sortation runs, from the data stored from earlier in the current sortation run to enhance the sortation process, or from the MRDF which drove creation of the mail piece. This information may allow corrections to be made to defective mail pieces. This, for example, could result in reduced reject processing overhead and reduced USPS rejects of mail at bulk mail acceptance facilities. Depending on the nature and composition of the mail pieces 105 being processed, a single pass sortation scheme or a sortation schemes with fewer sortation passes can be implemented with the arrangement.

Mail run data for mail pieces that are processed during a sortation run can be obtained and stored and/or merged into MRDF 160. This mail run data may be beneficially utilized during the sortation run to enhance the efficiency of the sortation run with certain mail pieces in the stack of mail pieces 105 encountered later in the processing which contain or have incompletely read information. Data obtained from BCR 120 or OCR 130, which may be attached to a mailing machine, inserter, or other system within the process flow of the mail pieces rather than sorter system 1, can be utilized to create the MRDF 160 and to continuously build and merge information about mail pieces in the mail generation and sortation process into the MRDF 160 before the documents reach the sortation processing. This information can be employed by subsequently processed mail pieces when needed such as when the BCR 120 or OCR 130 recovered data is insufficient to completely process a mail piece such as mail piece 115. The insufficient information that is obtained may be employed to search the MRDF 160 for a prior mail piece containing similar or identical needed information. Such use of the insufficient information for recognition of the mail piece allows the missing information to be accessed from the MRDF 160 thereby avoiding the need to send the mail piece such as mail piece 115 to a reject bin, not shown. Such a mail piece is maintained within the sortation process and moved into the appropriate destination sortation bin based on the information retrieved from the MRDF 160. The mail piece in question thus maintains its ordering or layering in multipass sortation processing.

Information (such as address, recipient name, account number, POSTNET bar code, PLANET bar code, remittance bar code) stored and associated with a mail piece may be accessed from MRDF 160 when only fragmentary information can be captured from a scanned mail piece. The fragmentary information may come from various sources of information scanned from the mail piece. This combined information, which may still be fragmentary, is employed to search previously stored mail piece information to identify the mail piece record and obtain the complete information for that mail piece. Moreover, this also allows information to be integrated that comes from different sources. The different sources of scanned information can include, for example, preprinted PLANET codes on envelopes and address information printed the envelope or on inserts behind an envelope window. Such information may be associated together for use in identifying the mail piece and retrieving a similar or identical mail piece record and also by subsequent processes downstream such as when tracing and tracing information is requested. As another example, a preprinted PLANET code might be associated with a particular advertising campaign or batch billing. The POSTNET code may describe a particular single family dwelling. The combination therefore describes a specific mail piece in that mailing and is the basis of the USPS PLANET code trace and track system. The present arrangement allows these two crucial data elements to become associated in a database for downstream tracking.

Figure 2:
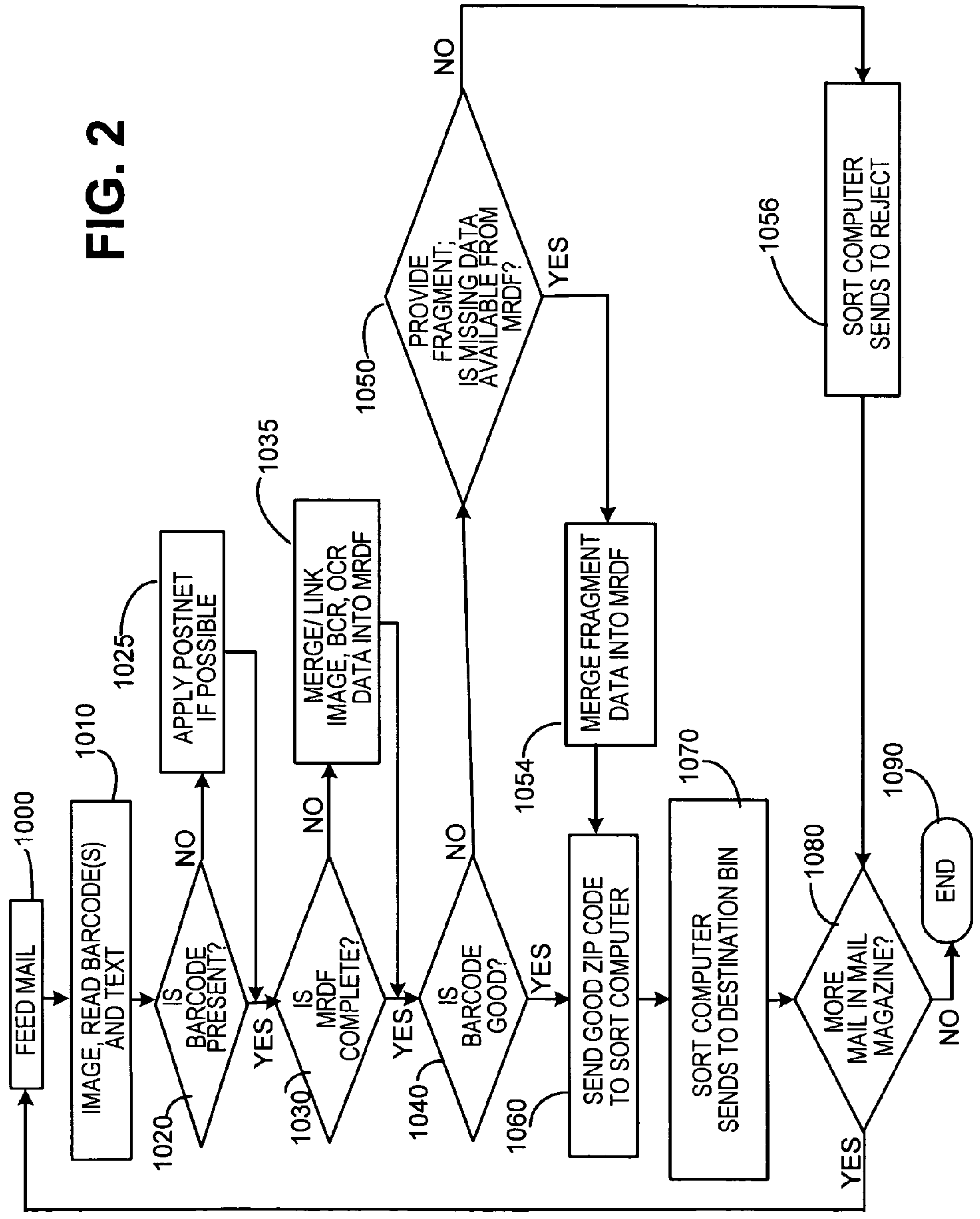
FIG. 2 is a flowchart of the operation of the reading, data capture and data access arrangement shown in FIG. 1; and, FIG. 3 is a flowchart of the operation of the arrangement shown in FIG. 1 with added functionality for track-and-trace operation for mail pieces with remote access by users via the internet.

Reference is now made to FIG. 2. As will be hereinafter described, mail pieces are scanned on the mail sorting system and information is captured and used to populate a MRDF. If the reads by the BCR 120 and OCR 130 are incomplete as explained above, data from the MRDF 160 is utilized to provide the necessary information based upon the fragmentary data obtained in that scan.

At 1000, mail pieces are fed onto the sorter transport 125. At 1010, the BCR and OCR image the mail pieces and read the bar codes and text. At 1020, a determination is made as to whether a POSTNET bar code is present on the mail piece (the first pass sortation run on a sorter is often used for bar coding mail pieces). If not, the POSTNET bar code is printed at step 1025 based upon the OCR data obtained from the mail piece. At 1030, a determination is made if all the captured valuable read information is already contained in the MRDF. If no, the captured image, BCR, and OCR data are merged into the MRDF at 1035. Positional data may be included with the stored information. Consider the address:

Douglas Quine
38 Chestnut Street
Boston Mass.

The OCR text can be stored with markers indicating that “Douglas Quine” was text read from line 1 of the address block, “38 Chestnut Street” was text read from line 2, and “Boston, Mass.” was text read from line 3.

The process then continues to decision block 1040. A determination is made if the read bar code and text are sufficient for the process to continue. If this is the case, the process continues at 1040. However, if this is not the case (e.g. on a mail piece being processed on a subsequent sortation pass), the process branches to block 1050, where known fragmentary data is provided and a request is made for missing data from the MRDF. If the insert slid to the left and obscured the beginning of the address, the system might, for instance, provide partial line 1 as: “in”, partial line 2 text as “t Street” and partial line 3 text as “sachusetts”. The database query would seek a matching or closely matching address information. If unique match is identified, any new data provided in the query fragment is added to the database at 1054 (e.g. text far to the right on the envelope insert which is now revealed). The process then continues at 1060, where good code information obtained from either the direct read of the mail piece is used and sent to the sort computer or data obtained from the mail piece along with the missing data from the MRDF are employed and sent to the sort computer. If there is no match or if there are multiple (ambiguous) matches then the piece cannot be decoded and may be rejected at 1056.

The process continues at 1060, where the sort computer or mail server 150 sends ZIP information to the destination sortation bin and causes the appropriate diverter, such as diverter 135, to be deployed at 1070 when the mail piece arrives at that bin. A determination is then made at 1080 if more mail is in the mail magazine. Where this is the case, the process loops back to block 1000. If this is not the case, the process ends at block 1090.

Figure 3:
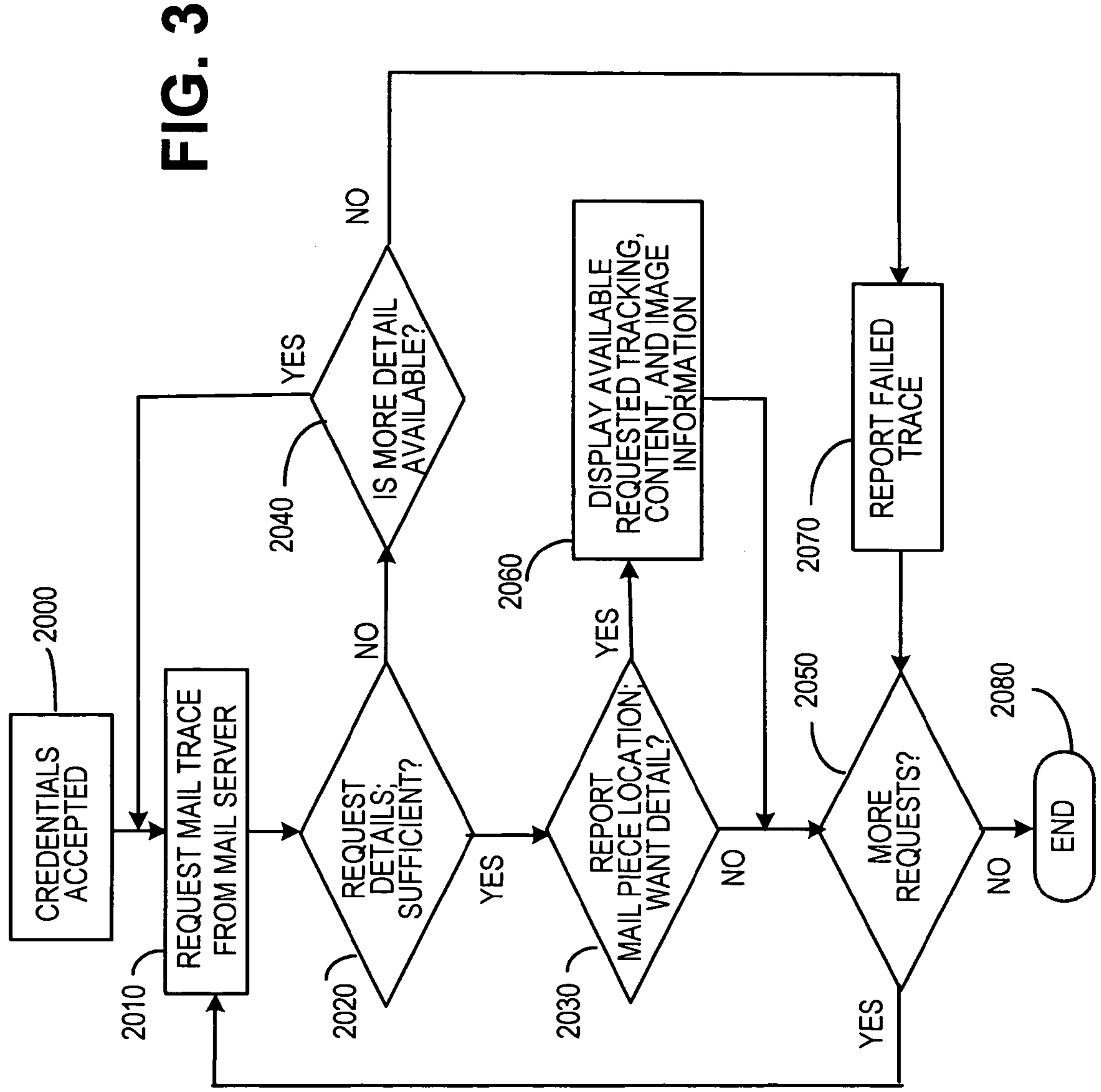

Reference is now made to FIG. 3. Remote requests from a corporate computer 180 or a recipient computer 190 for tracking information or information about the contents of mail pieces are processed through the system. These requests enable a user, such as a mail piece sender or recipient, to determine mail piece tracking information and to determine the contents of mail pieces before delivery.

At 2000, a user connects to the system by dialup modem, Internet, or other means and seeks access by providing acceptable credentials (e.g. username and password for the system). At 2010, the computer or mail server 150 is contacted and computer 180 or 190 presents a free form request or a formatted data request (e.g. a request form has known entries completed) to the mail server 150. The mail server makes a determination from the MRDF at 2020 whether sufficient details for the request to be fulfilled are available. Where the request contains sufficient details, the process continues at 2030. At decision block 2030, if the computer 180 or 190 seek to view full information, the process continues at 2060 and all available information is transmitted and displayed at the remote computer, such as tracking information, content information, and mail piece image.

Where the determination is made at decision block 2020 that the provided information is not sufficient, the program branches to 2040 and requests needed data from the MRDF. If additional data can be supplied, the program continues to block 2010, as previously described. If no more information is available, the request is ended and a failed trace is reported at 2070. The process continues at 2050, where a determination is made if more requests for information are pending. Where this is the case, the program loops back to block 2010 and the process repeats. Where this is not the case, the process ends at block 2080.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for sorting mail pieces containing delivery codes thereon comprising the steps of:

feeding mail pieces to a scanner system;

scanning said mail piece delivery codes;

storing complete mail piece delivery codes in an MRDF;

accessing a complete mail piece delivery code during a sortation run for a mail piece where the scanned delivery code is incomplete, said complete mail piece delivery code being selected based on the incomplete scanned delivery code;

transmitting said accessed complete mail piece delivery code to a sort computer; and, said sort computer processing said complete mail piece delivery code to determine a destination sortation bin for said mail piece with the incomplete scanned delivery code.

2. A method for sorting mail pieces as defined in claim 1 wherein said delivery codes are addressee delivery codes.

3. A method for sorting mail pieces as defined in claim 1 wherein said delivery codes are addressee delivery bar codes.

4. A method for sorting mail pieces as defined in claim 3 wherein said delivery codes further include tracking and tracing codes.

5. A method for sorting mail pieces, as defined in claim 1 where said delivery codes are POSTNET bar codes.

6. A method for sorting mail pieces as defined in claim 5 where said delivery codes further include PLANET bar codes.

7. A method for sorting mail pieces, as defined in claim 1 wherein said scanned mail pieces delivery code is representative of text on the mail piece and said scanning includes OCR of said text which is stored in the MRDF with said scanned code.

8. A method for sorting mail pieces, as defined in claim 1 wherein said MRDF is accessed for mail pieces during the sortation run where the scanned mail pieces delivery code and text are incomplete.

9. A method for sorting mail pieces as defined in claim 1 wherein said MRDF logs processing information for mail pieces.

10. A method for sorting mail pieces, as defined in claim 9 wherein said MRDF is accessed to obtain trace and track information relating to mail pieces.

11. A method for sorting mail pieces, as defined in claim 1 wherein said MRDF is accessed externally to alert a recipient as to a status of a particular mail piece.

* * * * *